(12) United States Patent
Giesler et al.

(10) Patent No.: US 6,893,151 B2
(45) Date of Patent: May 17, 2005

(54) DEVICE FOR CONVEYING ELASTOMERIC MEDIA, USE OF THE DEVICE, AS WELL AS TWO OPERATING METHODS

(75) Inventors: Joerg Giesler, Zurich (CH); Hans Sonder, Wald (CH); Heinrich Holzer, Niederglatt (CH); Hans-Dieter Wagner, Eggingen (DE); Michael Heinen, Zurich (CH)

(73) Assignee: Maag Pump Systems Textron AG, Zurich (CH)

( * ) Notice: Subject to any disclaimer, the term of this patent is extended or adjusted under 35 U.S.C. 154(b) by 183 days.

(21) Appl. No.: 09/819,071

(22) Filed: Oct. 9, 2001

(65) Prior Publication Data

US 2003/0107945 A1 Jun. 12, 2003

Related U.S. Application Data

(63) Continuation of application No. 09/784,332, filed on Feb. 16, 2001, now abandoned.

(30) Foreign Application Priority Data

Oct. 13, 2000 (EP) .............................................. 00122436

(51) Int. Cl.⁷ .............................. B29B 7/14; B29B 7/74
(52) U.S. Cl. .......................... 366/78; 366/79; 425/197; 425/317; 425/207
(58) Field of Search .......................... 366/78, 79, 286, 366/297, 149, 77, 184; 425/197, 317, 207, 208; 418/818, 181; 210/171

(56) References Cited

U.S. PATENT DOCUMENTS

| | | | |
|---|---|---|---|
| 2,505,125 A | | 4/1950 | List |
| 2,692,405 A | * | 10/1954 | Gayler ..................... 425/379.1 |
| 2,767,437 A | * | 10/1956 | Marshall ..................... 425/197 |
| 3,115,681 A | * | 12/1963 | Hendry ........................ 366/78 |
| 3,552,722 A | * | 1/1971 | Sutter ......................... 366/143 |
| 3,595,533 A | * | 7/1971 | Sutter .......................... 366/78 |
| 3,649,147 A | * | 3/1972 | Fritsch ....................... 425/207 |
| 3,865,354 A | * | 2/1975 | Burpulis et al. ........... 366/76.2 |
| 3,876,188 A | * | 4/1975 | Koch et al. ................... 366/78 |
| 4,286,882 A | | 9/1981 | Schiesser |
| 4,461,734 A | * | 7/1984 | Jones et al. ................. 425/207 |
| 4,890,996 A | * | 1/1990 | Shimizu ..................... 425/208 |
| 4,907,891 A | * | 3/1990 | Pointon ....................... 366/78 |
| 5,156,781 A | | 10/1992 | Boehm et al. |
| 5,182,066 A | * | 1/1993 | Marin ......................... 425/197 |
| 5,304,053 A | * | 4/1994 | Gohlisch et al. ............ 425/204 |
| 5,310,256 A | * | 5/1994 | Boden .......................... 366/77 |
| 5,356,208 A | | 10/1994 | Tadmor ........................ 366/79 |
| 5,378,415 A | * | 1/1995 | Gohlisch et al. .............. 366/77 |
| 5,863,485 A | * | 1/1999 | Groleau ...................... 425/207 |
| 6,306,323 B1 | * | 10/2001 | Chu et al. ................... 425/145 |
| 6,468,067 B1 | * | 10/2002 | Ikegami ....................... 366/77 |
| 6,488,490 B1 | * | 12/2002 | Seta et al. .................. 425/207 |

FOREIGN PATENT DOCUMENTS

| | | |
|---|---|---|
| DE | 1579001 | 7/1970 |
| EP | 0508079 | 10/1992 |
| EP | 0508080 | 10/1992 |
| EP | 99/03666 | 1/1999 |
| FR | 1494681 * | 9/1967 |
| JP | 08-132433 | 9/1996 |
| JP | 11-198214 | 7/1999 |

* cited by examiner

Primary Examiner—Tony G. Soohoo
(74) Attorney, Agent, or Firm—Crowell & Moring LLP

(57) ABSTRACT

A system for delivering elastomeric media comprises a gear pump and a screw-type extruder which, viewed in the delivery direction of the pumping medium, is arranged in front of the gear pump and which comprises a screw and a screw casing. The screw casing has at least one conical part, and the screw has at least one tapering in the area of the conical part. For the controlled feeding of energy into the pumping medium, the screw is axially displaceable in the screw casing.

19 Claims, 2 Drawing Sheets

DEVICE FOR CONVEYING ELASTOMERIC MEDIA, USE OF THE DEVICE, AS WELL AS TWO OPERATING METHODS

This application is a continuation of Ser. No. 09/784,337, filed Feb. 16, 2001, now abandoned.

BACKGROUND AND SUMMARY OF THE INVENTION

The present invention relates to a system comprising a gear pump and a screw-type extruder for delivering elastomeric media, particularly caoutchouc, which comprises a screw and a screw casing, the screw-type extruder being arranged in front of the gear pump viewed in the delivery direction of the pumping medium. The invention relates to a use of the system as well as to two operating methods.

Gear pumps will be used particularly when a pumping medium of a constant flow rate is to be delivered at a comparatively high pressure. In particular, gear pumps are suitable for delivering very viscous media, among others, also elastomers. Thus, gear pumps have been used in the rubber industry for delivering caoutchouc mixtures.

When using a gear pump for delivering elastomeric media, the technological requirement consists of completely filling the tooth spaces of the gears in order to achieve a constant flow rate. In order to be able to fill the tooth spaces as completely as possible, it has been suggested to arrange a feeding system in front of the gear pump viewed in the delivery direction of the pumping medium.

Thus, reference is first made to Swiss Patent Document CH-A4-621 515 which describes an aggregate with spaced feeding rollers for generating a filling pressure in front of the gear pump. It was found that these known feeding devices, also called "torque feeders", only insufficiently fill the gear pump or the tooth spaces of the gears.

Furthermore, from European Patent Document EP-A2-0 508 080, European Patent Document EP-A2-0 508 079 and from U.S. Pat. No. 5,156,781, systems are known in which a screw, which is also called an extruder, is arranged as a feeding device in front of a gear pump. Although a good filling of the tooth spaces of the gears is achieved by means of the extruder, often too much friction energy is charged in an uncontrollable manner into the pumping medium, which results in the danger of a cross-linking-on, particularly during the processing of caoutchouc.

The teaching disclosed in U.S. Pat. No. 5,156,781 differs from the above-mentioned published European patent documents in that a filter is provided between the extruder and the gear pump in the case of the first-mentioned patent document. As a result, the flow path for the pumping medium is significantly larger, whereby additional energy has to be charged into the pumping medium because, depending on the degree of contamination of the filter, a certain additional pressure drop must be overcome which occurs over the filter.

Furthermore, reference is made to German Published Patent Application Number DE-1 579 001, in which a screw-type extrusion machine is disclosed which, for modulating pressure fluctuations in the pumping medium, has a continuously tapering interior screw casing wall in the direction of the outlet end. The envelope of the screw body is constructed correspondingly. The modulation of occurring pressure fluctuations takes place by the axial displacement of the screw body in the screw casing, whereby the return flow of pumping medium is increased or reduced as a function of the position of the screw body in the screw casing. As in the above-mentioned known teachings, the charging of friction energy into the pumping medium takes place in an uncontrolled manner. For this reason, the above-mentioned disadvantages must also be expected in the case of this known teaching.

It is therefore an object of the present invention to provide a system in which the above-mentioned problems are avoided.

This object is achieved by a system of the above-noted type, wherein the screw casing has at least one conical part, and the screw has at least one tapering in an area of the conical part, and wherein the screw is axially displaceable in the screw casing for the controlled feeding of energy into the pumping medium. Advantageous further developments of the invention, a use as well as two operating methods are indicated herein and in the claims.

The invention has the following advantages: In that the feeding device or at least one of its main components, preferably a screw, is displaceable with respect to the screw casing and, as a result, the energy charged into the pumping medium by the feeding device can be controlled, the danger of a cross-linking-on of the pumping medium can be successfully prevented, or at least be considerably reduced.

In the following, the invention will be explained in detail by means of drawings in the manner of an example.

DETAILED DESCRIPTION OF THE DRAWINGS

Figure 1:
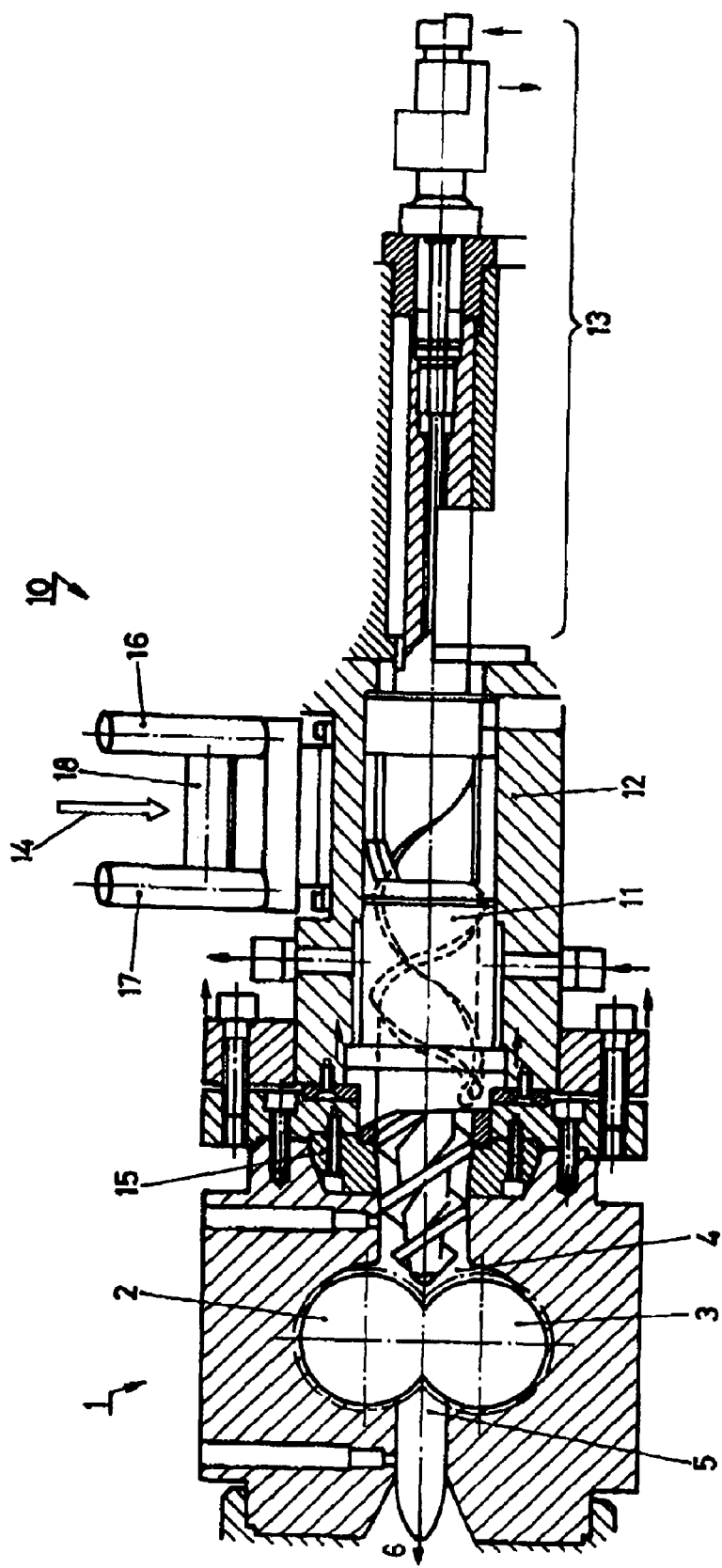
FIG. 1 is a view of a system according to the invention comprising a gear pump and a screw-type extrusion machine connected in series.

FIG. 1 illustrates a system according to the invention comprising a gear pump 1 and a screw-type extruder 10, viewed in the delivery direction 6 of a pumping medium, the gear pump 1 being arranged behind the screw-type extruder 10. The screw-type extruder 10 comprises a screw 11 which, in a preferred embodiment, has a double-helix-type construction, and of a screw casing 12 which, by way of various connecting devices, is flanged to the pump case of the gear pump 1, the screw 11 preferably projecting into the pump case.

According to the invention, the screw 11 has a tapering on its gear-pump-side end. Correspondingly, a cone 15 is provided in this area as a separate or as an integrated component of the screw casing 12. Furthermore, the screw-type extruder 10 comprises an adjusting unit 13 which is essentially arranged on the axis of the screw 11 but at the opposite end with respect to the gear pump 1.

In a preferred embodiment, the screw casing 12—and correspondingly, the envelope of the screw 11—have a cylindrical and a conical part, in which case these parts may be manufactured of one or of several workpieces. It is also contemplated that the entire screw casing 12—and thus again the envelope of the entire screw 11 have a conical shape. In a preferred embodiment, the ratio of the conical part to the cylindrical part is between 1:2 to 1:5, preferably approximately 1:4.

By means of the adjusting unit 13, the screw 11 can be displaced in the axial direction relative to the gear pump 1. As a result of the tapering of the screw 11 and the conical further development of the corresponding part of the screw casing 12, the gap size between the screw edge and the screw casing 12 in the area of the tapering or of the cone 15 can be adjusted. This permits the checking and controlling of the energy charged into the pumping medium by friction during the delivery operation in the screw-type extruder 10. Thus, the risk of the cross-linking-on of the pumping medium can be avoided or at least greatly reduced.

The pumping medium existing in strip shape is introduced by way of the rollers 16, 17 and 18 into the screw-type extruder 10 (arrow 14) and is gripped by the screw 11. The transport of the pumping medium now takes place in the axial direction of the screw 11 to the gear pump 1, in which the pumping medium is transported from the suction side 4 to the delivery side 5. The main delivery direction is indicated by reference number 6 in FIG. 1.

In a preferred embodiment of the invention, the length of the screw 11 amounts to less than five times, preferably less than three times the diameter of the screw 11. These short embodiments for the screw-type extruder 10 are permitted by the conical construction or the tapering and the above-mentioned axial displacement of the screw 11. This results in a reduced and controlled delivery of friction energy to the pumping medium. In the case of long screw-type extruders according to the prior art—that is, in the case of screws whose length amounts to more than ten times the diameter—the friction energy charged into the pumping medium is considerably higher. Furthermore, the amount of charged energy is not controllable.

The screw-type extruder 10 according to the invention permits the separation of the process steps of plastifying and pressure buildup, in that the screw-type extruder 10 is not provided for the pressure buildup but only for the plastifying. The gear pump 1, which is extremely suitable for this purpose, is used for the pressure buildup. In this case, it is provided in a preferred embodiment that the screw-type extruder 10 is arranged directly on the gear pump 1 so that—also preferably—the screw 11 projects into the pump case of the gear pump 1—optionally to directly in front of the gears. The term "screw casing" therefore also definitely includes part of the pump case of the gear pump 1, since this pump case also accommodates the screw 11 of the screw-type extruder 10.

In a preferred embodiment of the invention, it is provided that the screw-type extruder 10 be constructed such that a tangential plane on the screw 11 in the area of the tapering encloses an angle of from 2 to 10°, preferably 8°, with the center axis of the screw 11.

FIG. 1 illustrates an individual tapering and an individual cone. It is also contemplated that several taperings or cones can be provided which are arranged behind one another. As a result, there is no departure from the principle of the invention.

Figure 2:
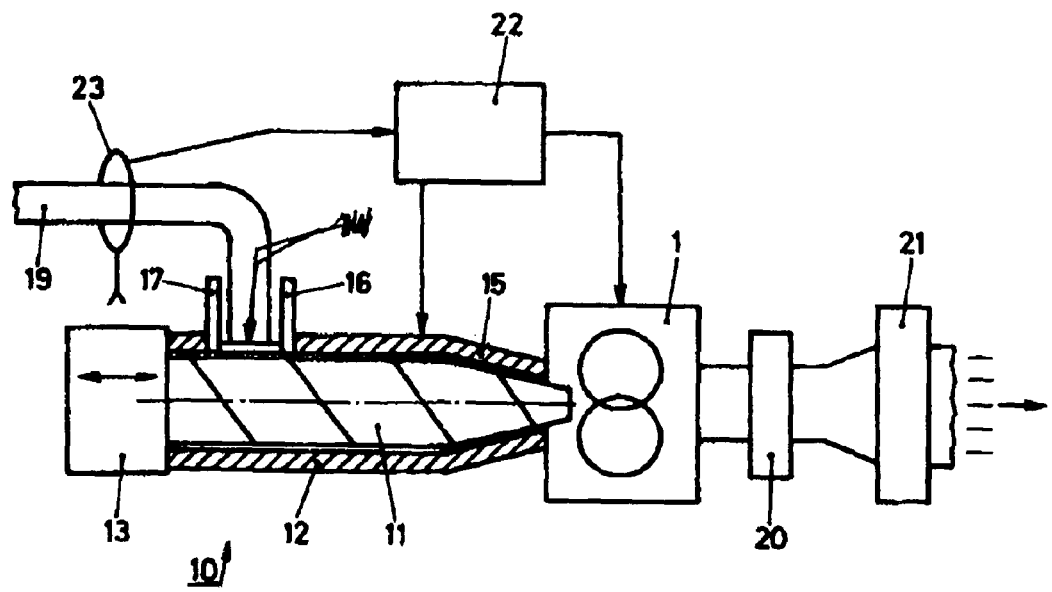
FIG. 2 is a view of another embodiment of the system according to the invention.

FIG. 2 is a schematic view of another embodiment of the system according to the invention. In addition to the components of the system according to the invention explained by means of FIG. 1—such as the gear pump 1, the screw-type extruder 10 and the adjusting unit 13, including their parts—reference numbers 20 to 23 indicate a spraying head, a control unit and a metal detector.

According to U.S. Pat. No. 5,156,781, it is known to filter the pumping medium before the processing, that is, in front of the spraying head, so that no contaminations can reach the end product and the spraying head is not damaged, or its openings are not clogged. So that possible metal particles contained in the pumping medium cannot damage the gear pump, it was always suggested to arrange the filter between the screw-type extrude and the gear pump. However, this has the disadvantage that the filling pressure in front of the gear pump is reduced, specifically the more, the more severe the contamination of the filter. As a countermeasure the capacity of the screw-type extruder had to be increased in order to compensate the pressure drop above the filter. As a result thereof, the known disadvantages concerning the uncontrolled charging of energy into the pumping medium, which were listed in the introduction, have to be accepted.

For avoiding these disadvantages, it is suggested to arrange the filter 20 behind the gear pump 1. As a result, a clearly shorter flow path is obtained for the pumping medium which is extremely important particularly when delivering caoutchouc. The reason is that the pressure for filling the tooth spaces in the case of the gear pump 1 which is to be built up by the screw-type extruder 10 becomes minimal, whereby simultaneously the charging of energy into the pumping medium will be minimal at a specific flow rate. In other words, by means of the arrangement according to the invention, the flow can be increased in comparison to the known teaching—while the energy charge remains constant—, which causes a higher productivity with respect to manufacturing. Particularly in the tire industry, this is of great economical importance.

Considerably better results are already obtained by means of the above-described arrangement comprising the screw-type extruder, the gear pump 1 and the filter 20, although a screw-type extruder is used which is know per se. Even better results are obtained when a screw-type extruder 10 according to FIG. 1 is used, which therefore represents the preferred embodiment.

Furthermore, the arrangement according to the invention allows the projecting of the screw 11 into the pump inlet of the gear pump 1. As a result, the flow path of the pumping medium can be shortened further.

If it is to be expected that metal particles may be contained as impurities in the pumping medium, it is also suggested to provide a metal detector 23 in front of the gear pump 1, by means of which metal particles which may be contained in the raw material can be detected. So that, when a metal piece is detected, the discharge system can be protected from damage, the control unit 22 is provided which, on the one hand, is connected with the metal detector 23 and, on the other hand, with the drives of the gear pump 1 and of the screw 11. As soon as a metal piece is detected by the metal detector 23, a corresponding signaling to the control unit 22 takes place, which, in turn, triggers corresponding actions; that is, in particular, stops the drives of the gear pump 1 and of the screw 11, before the detected metal piece is gripped by the gears of the gear pump 1.

In the preferred embodiment illustrated in FIG. 2, the metal detector 23 is arranged in front of the opening 14, viewed in the delivery direction of the pumping medium. As a result, it can be achieved that a detected metal piece can also not be gripped by the screw 11, if the control unit 22 switches off the drives of the gear pump 1 and of the screw 11 in time. If the metal detector 23 is arranged at a sufficient distance in front of the opening 14, it will be possible for an operator to remove a detected piece of metal from the raw material. As a result, a switching-off of the drives of the gear pump 1 and of the screw 11 may possibly not be necessary, whereby a continuous operation can be ensured which is very important for optimizing production.

If the raw material consists of a strip, it is provided that, when a metal piece is detected, the operator cuts off the strip section in which is detected metal piece is situated, the two cut sections being rejoined before reaching the opening 14. During this operation, the delivery is not interrupted. It is a prerequisite for this handling that the metal detector 23 is situated at a sufficiently large distance in front of the opening 14.

Figure 3:
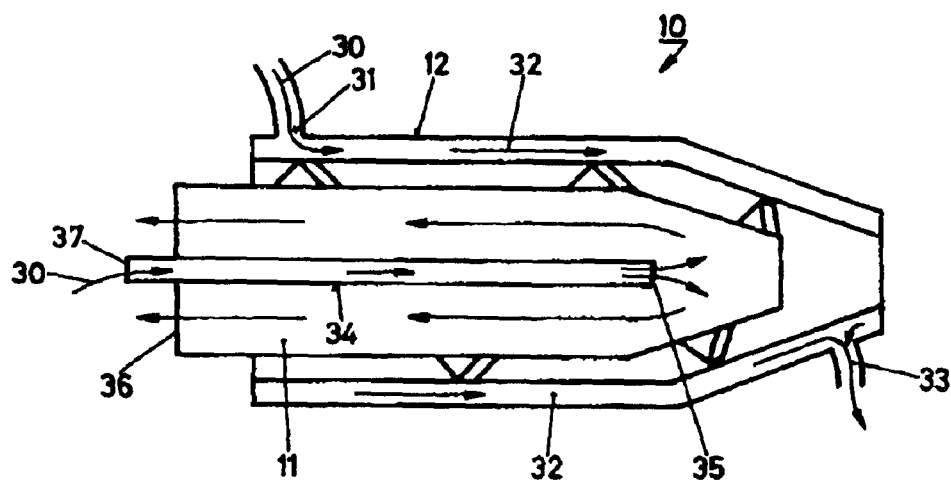
FIG. 3 is a view of a screw-type extruder with a temperature adjusting unit.

FIG. 3 shows a screw-type extruder 10 which is connected with a temperature adjusting unit (not shown in FIG. 3) for adjusting or holding a definable ideal temperature for a pumping medium contained in the screw-type extruder. In this case, the temperature adjusting unit is a cooling and/or heating assembly which contains a temperature adjusting medium and which is connected with the screw casing 12 and/or with the screw 11, the temperature adjusting unit being connected with the screw casing 12 or the screw 11 by way of openings 31, 33 and 37, 36. The screw casing 12 as well as the screw 11 have a hollow construction for accommodating the temperature adjusting medium 30 or the transport ducts for the temperature adjusting medium 30. As required, walls are provided in these hollow spaces, so that the temperature adjusting medium 30 provides a temperature distribution which is as uniform as possible. In the screw casing 12, for example, helical walls are provided which guide the temperature adjusting medium 30 in helical ducts from opening 31 to opening 33. In contrast, a feeding tube 34 is provided in the screw 11 by way of which temperature adjusting medium 30 is guided into the interior of the screw 11. Between the feeding tube 34 and the interior wall of the screw 11, the temperature adjusting medium is returned by way of the opening 36 to the temperature adjusting unit.

In order to achieve an optimal temperature adjustment required for the respective situation, various configurations are suggested. Thus, in the case of a minimal variant, only one temperature adjusting unit exists to which the circulation through the screw casing 12 as well as through the screw 11 are connected, this taking place either in a parallel or a serial connection. In contrast, a maximal development of the cooling system consists of that fact that one temperature adjusting unit is provided for each cooling circulation system; that is, one for the screw casing 12 and one for the screw 11. This makes it possible to adjust the surface temperatures of the screw 11 and of the screw casing 12 independently of one another.

As a further development of the above concepts for adjusting the temperature, it is conceivable to also include a temperature adjusting unit which may exist for the temperature adjustment of the gear pump 1. It is therefore possible to use the temperature adjusting unit for the gear pump completely or partially for the adjustment of the temperature in the screw-type extruder.

It is pointed out again that the screw-type extruder 10 may be a pin-type extruder, a conventional extruder or an extruder fed by strips. Reference is made to U.S. Pat. No. 5,156,781 with respect to the various construction variants.

The filter 20 is of a known construction, in which case it is conceivable that it can be exchanged either manually or automatically.

What is claimed is:

1. System comprising a gear pump and a screw-type extruder for delivering elastomeric media which comprises a screw and a screw casing, the screw-type extruder being arranged in front of the gear pump viewed in the delivery direction of the elastomeric media,
   wherein the screw casing has at least one conical part downstream of a cylindrical part located downstream of a feed opening, and the screw has at least one tapering in an area of the conical part, wherein the screw is axially displaceable in the screw casing for the controlled feeding of energy into the elastomeric media, and wherein the screw projects into the case of the gear pump.

2. System according to claim 1,
   wherein the tapering of the screw as well as the conical part are provided on the gear-pump-side end of the screw-type extruder.

3. System according to claim 1,
   wherein the tapering of the screw increases viewed in the delivery direction of the medium.

4. System according to claim 1,
   wherein the screw has a double-helix-type construction.

5. System according to claim 1,
   wherein a tangential plane on the screw in the area of the tapering encloses an angle of from 2 to 10 with the center axis of the screw.

6. System according to claim 1,
   wherein the length of the screw is less than five times the diameter of the screw.

7. System according to claim 1,
   wherein the ratio of the length of the conical part to the length of the cylindrical part is between 1:2 to 1:5.

8. System according to claim 1,
   wherein the length of the cone is less than the diameter of the screw.

9. System according to claim 1,
   wherein the screw and/or the screw casing each have one hollow space respectively with at least two openings for admitting and discharging a temperature adjusting medium.

10. System according to claim 1,
    wherein a filter is provided which, viewed in the delivery direction, is arranged behind the gear pump.

11. System according to claim 10,
    wherein the filter is arranged between the gear pump and the spraying head.

12. System according to claim 1,
    wherein a metal detector is arranged in front of the gear pump, preferably in front of the screw-type extruder, and
    wherein a control unit is provided which is operatively connected with drives of the screw and of the gear pump and with the metal detector.

13. Method of operating the system according to claim 12,
    wherein, when a metal piece is detected, the delivery of the pumping medium is interrupted in that the drives of the screw and of the gear pump are stopped.

14. Method of operating the system according to claim 12,
    wherein a detection of a metal piece is indicated to an operator who intervenes in the transport process of the pumping medium for removing the metal piece without requiring an interruption of the production process.

15. A conveying assembly comprising:
    a screw-type extruder operable to deliver elastomeric media, and
    a gear pump disposed downstream of the screw-type extruder,
    wherein the screw-type extruder includes a screw and a screw casing surrounding the screw, said screw casing including a conically tapered section downstream of a cylindrical section located downstream of a feed opening, said screw including a corresponding conically tapered section adjacent to the conically tapered section of the screw casing, wherein the screw projects into the case of the gear pump, and wherein the screw is axially displaceable with respect to the screw casing during conveying operations.

16. A conveying assembly according to claim 15, comprising openings for admitting temperature adjusting medium to respective hollow spaces at at least one of the screw and screw casing.

17. A conveying assembly according to claim 15, comprising a filter disposed downstream of the gear pump.

18. A conveying assembly according to claim 15, wherein a metal detector is arranged in front of the gear pump, preferably in front of the screw-type extruder, and wherein a control unit is provided which is operatively connected with drives of the screw and of the gear pump and with the metal detector.

19. A method of conveying elastomeric material using a conveying assembly comprising:

a screw-type extruder operable to deliver elastomeric media, and a gear pump disposed downstream of the screw-type extruder, wherein the screw-type extruder includes a screw and a screw casing surrounding the screw, said screw casing including a conically tapered section downstream of a cylindrical section located downstream of a feed opening, said screw including a corresponding conically tapered section adjacent to the conically tapered section of the screw casing, wherein the screw projects into the case of the gear pump, and wherein the screw is axially displaceable with respect to the screw casing during conveying operations, said method comprising:

feeding elastomeric material to the gear pump with said screw-type extruder, and pumping said elastomeric material with the gear pump while varying the axial position of the screw and screw casing to assure control of energy in the elastomeric material supplied to the gear pump.

* * * * *